United States Patent
Kahlman

(10) Patent No.: US 8,537,237 B2
(45) Date of Patent: Sep. 17, 2013

(54) REAL-TIME DIGITAL IMAGE PROCESSING ARCHITECTURE

(75) Inventor: Josephus Arnoldus Henricus Maria Kahlman, Tilburg (NL)

(73) Assignee: Koninklijke Philips N.V., Eindhoven (NL)

( * ) Notice: Subject to any disclaimer, the term of this patent is extended or adjusted under 35 U.S.C. 154(b) by 395 days.

(21) Appl. No.: 12/919,519

(22) PCT Filed: Dec. 18, 2008

(86) PCT No.: PCT/IB2008/055407
§ 371 (c)(1),
(2), (4) Date: Aug. 26, 2010

(87) PCT Pub. No.: WO2009/112905
PCT Pub. Date: Sep. 17, 2009

(65) Prior Publication Data
US 2011/0007183 A1 Jan. 13, 2011

(30) Foreign Application Priority Data
Mar. 12, 2008 (EP) .................................. 08102552

(51) Int. Cl.
*H04N 5/235* (2006.01)
*H04N 5/228* (2006.01)
*G06K 9/00* (2006.01)

(52) U.S. Cl.
USPC ...................... 348/222.1; 348/229.1; 382/128

(58) Field of Classification Search
USPC ................ 348/222.1, 229.1, 221.1, 256, 362, 348/364; 382/128, 129, 130, 133, 134, 132; 356/39, 445; 377/10; 702/19
See application file for complete search history.

(56) References Cited

U.S. PATENT DOCUMENTS

| | | | |
|---|---|---|---|
| 5,642,516 A | 6/1997 | Hedayat et al. | |
| 6,349,144 B1 * | 2/2002 | Shams | 382/129 |
| 6,584,217 B1 * | 6/2003 | Lawless et al. | 382/133 |
| 6,591,196 B1 * | 7/2003 | Yakhini et al. | 702/28 |
| 6,674,885 B2 * | 1/2004 | Hansen et al. | 382/133 |
| 7,116,809 B2 * | 10/2006 | Bartell | 382/128 |

(Continued)

FOREIGN PATENT DOCUMENTS

| | | |
|---|---|---|
| DE | 69915481 T2 | 3/2005 |
| WO | 2005012878 A2 | 2/2005 |
| WO | 2005029031 A2 | 3/2005 |

OTHER PUBLICATIONS

Mason et al: Quantitative Real-Time Imaging of Optical Probes in Living Cells; Chapter 12, pp. 175-179, Flourescent and Luminescent Probes for Biological Activity: A Practical Guide to Technology for Quantitative Real-Time Analysis (Biological Techniques), 1993.

(Continued)

*Primary Examiner* — Aung S Moe

(57) ABSTRACT

A digital image processing device processes digital images provided by a camera of biosensor reader. The device includes a pixel processing unit for evaluating a stream of image values with respect to a given set of processing spots in the image area, thus determining characteristic parameters like the integral of pixel values in the processing spots. The pixel processing unit communicates with a higher-level digital control unit that sets the processing spots to be evaluated and that reads out and post-processes the results of the pixel processing unit.

17 Claims, 11 Drawing Sheets

(56) References Cited

U.S. PATENT DOCUMENTS

| | | |
|---|---|---|
| 7,187,446 B2 | 3/2007 | Kimura |
| 7,526,114 B2* | 4/2009 | Xia et al. ............... 382/128 |
| 7,599,090 B2* | 10/2009 | Li et al. ............... 358/1.8 |
| 7,745,143 B2* | 6/2010 | Casasanta, III ............ 435/7.1 |
| 7,920,736 B2* | 4/2011 | Sammak et al. .......... 382/133 |
| 8,005,280 B2* | 8/2011 | Mott et al. ............... 382/128 |
| 8,050,868 B2* | 11/2011 | Rosania et al. ............ 702/19 |
| 2001/0034068 A1* | 10/2001 | Spivey et al. ............ 436/518 |
| 2001/0041347 A1* | 11/2001 | Sammak et al. ........... 435/7.23 |
| 2004/0181342 A1 | 9/2004 | Zhou |
| 2006/0014137 A1* | 1/2006 | Ghosh et al. ............... 435/4 |
| 2006/0019265 A1* | 1/2006 | Song et al. ............... 435/6 |
| 2006/0173636 A1 | 8/2006 | Friedt et al. |
| 2007/0081163 A1 | 4/2007 | Liang et al. |
| 2008/0232659 A1* | 9/2008 | Tajima et al. ............ 382/128 |
| 2010/0260406 A1* | 10/2010 | Sammak et al. ............ 382/133 |
| 2010/0311183 A1* | 12/2010 | Kahlman .................. 436/166 |
| 2011/0007178 A1* | 1/2011 | Kahlman .................. 348/222.1 |
| 2011/0008213 A1* | 1/2011 | Kahlman et al. ........... 422/82.05 |
| 2012/0120233 A1* | 5/2012 | Li et al. ............... 348/135 |

OTHER PUBLICATIONS

Feldstein et al: "Array Biosensor: Optical and Fluidics Systems"; Journal of Biomedical Microdevices, vol. 1, No. 2, 1999, pp. 139-153.

Ligler et al: "The Array Biosensor: Portable Automated Systems"; Analytical Sciences, Japan Society for Analytical Chemistry, vol. 23, Jan. 2007, pp. 5-10.

* cited by examiner

REAL-TIME DIGITAL IMAGE PROCESSING ARCHITECTURE

The invention relates to a method and a digital image processing device for real-time evaluation of a sequence of image frames provided by a camera. Moreover, it relates to a computer program product for executing such a method.

In portable optical biosensors like the one described in DE 699 15 481 T2, a large area of a cartridge with a sample to be investigated can optically be read out in one step and simultaneously with high spatial resolution by using a digital camera. The sequence of frames provided by such a camera then has to be evaluated with respect to local processes taking place in the sample. Doing this processing by software on a general purpose processor requires a high processing power which is often not available in small, portable devices.

Based on this background it was an object of the present invention to provide means for an efficient evaluation of digital images, wherein it is desirable that these means allow for a real-time evaluation of images in a portable device like a biosensor.

The digital image processing device according to the present invention serves for the real-time evaluation of a sequence of image frames provided by a digital camera, e.g. a CCD or CMOS camera. The image may particularly depict an area of a cartridge in some optical biosensor, though the present invention is not limited to this application. The image processing device comprises the following two main components:

a) A digital "pixel processing unit" for determining at least one characteristic parameter relating to a set of processing spots in the image area, wherein said determination is done from a stream of image values. The pixel processing unit may particularly be realized by some special digital hardware, for example a Field Programmable Gate Array (FPGA). A "processing spot" shall refer to a sub-region of interest lying within the whole area that is imaged by the camera. The mentioned "set of processing spots" may comprise just one element, preferably however a plurality of such processing spots. Usually (but not necessarily), the processing spots will be non-overlapping. Finally, it should be noted that the "image values" refer to the digital values of the individual image points or pixels that compose the complete frame; the image values typically represent a brightness and/or color (e.g. in RGB coordinates).

b) A higher-level "digital control unit" that is coupled with the pixel processing unit for a communication with it, and that is adapted to set (determine and fix) the set of processing spots currently to be dealt with by the pixel processing unit. Moreover, the digital control unit is adapted to read out and post-process the characteristic parameter(s) determined by the pixel processing unit. The digital control unit will typically comprise some general purpose digital data processing hardware like a microcomputer or a microcontroller with associated software.

The described image processing device provides an architecture that is optimally suited for a fast, real-time processing of frames coming from a camera because it realizes an intelligent task-sharing: On the one hand side, a fast (but simple) continuous processing of the perpetually incoming stream of image values by the pixel processing unit; on the other hand side, a higher-level control of the whole procedure and a more sophisticated further evaluation of the raw results by the digital control unit. In this way the general-purpose computing capacity of the device is freed from directly dealing with the stream of input data and can instead concentrate on higher-level control and evaluation tasks.

It was already mentioned that the processing spots refer in general to (connected or disconnected) sub-regions of the image area. Preferably, a processing spot relates to a rectangular image region with the edges of this region being oriented parallel to the rows and columns of the image frames, respectively. Such a processing spot can then favorably be described by just the four coordinates of the first/last row/column. Moreover, such a shape is particularly suited for the processing of a stream of pixels representing an image row-by-row.

The set of processing spots may comprise just one single processing spot only. Preferably, it comprises a plurality of processing spots which are dealt with in parallel by the pixel processing unit. The plurality of processing spots may be spread over the whole image area, thus covering the complete frame, or the processing spots may lie in an image stripe only. In the latter case, the processing of a complete image frame will usually be done by processing a series of image stripes one after the other.

In general, the at least one characteristic parameter that is determined by the pixel processing unit may be any quantity one is interested in that can be calculated from the stream of image values (pixels). In most cases, the characteristic parameter will be a quantity that can readily and in a one pass be determined from the stream of image values, for example some integral (sum) of image values. In particular, the characteristic parameter may comprise the (normalized) integral of all image values (e.g. gray-levels) in a processing spot under consideration and/or of a function of the deviations of all these image values from a given reference value (e.g. of the absolute deviations or the squares of the deviations). The first of these integrals relates to the brightness of the processing spot, while the second one represents the spatial variation (noise) of this value in the spot area.

The aforementioned reference value and/or its changing rate may optionally be determined by the digital control unit based on characteristic parameters of previous frames.

The digital image processing device may particularly comprise at least one register, called "shadow register", for transiently storing data to be exchanged between the pixel processing unit and the digital control unit. In this way the requirements on the speed of data exchange can be relaxed.

Depending on the particular application, different methods will be most appropriate to set the current set of processing spots in the pixel processing unit by the digital control unit. Thus the set of processing spots may for instance be set once before the evaluation of a whole sequence of frames. This approach is possible if the processing spots are the same in all consecutive frames and if there is enough capacity to store the data of all processing spots.

If however the position and/or shape of the processing spots changes from frame to frame, the set of processing spots will rather be set anew in the pixel processing unit at the beginning of each new frame. Similarly, the set of processing spots can be set at the beginning of each predetermined sub-frame of a complete frame, for example always at the beginning of a new stripe (comprising a given number of image lines) of the camera image. Such a processing of sub-frames will usually be applied if the pixel processing unit has not enough capacity to deal with all processing spots of the complete frame in parallel.

Finally, the current set of processing spots can be set on demand of the pixel processing unit. Each time the pixel processing unit has completed the evaluation of a processing spot, it may for example issue an interrupt to the digital control unit indicating that results (characteristic parameters) of the processing spot are available and that the coordinates of a new processing spot to be evaluated can be set. This approach has the highest flexibility with respect to the position and/or shape of the processing spots, i.e. they can be distributed quite arbitrarily (like mushrooms in a culture) throughout the image area.

In a further development of the invention, the digital control unit is designed to iteratively adapt a processing spot (e.g. in position, shape, and/or size) to the image of a marker, i.e. to a structure of known appearance (shape, size, brightness and/or color) in the images provided by the camera. The adaptation of the processing spot to the marker is usually done on a frame-to-frame basis and will finally yield information about the marker in the image, for example its position, size and/or shape. The marker may for example result from a line, a cross, a circle, or some other sign comprised by the object that is imaged. Knowing the position of one or more markers will allow to infer the positions of other regions in the image, for example of investigation regions that are (at least initially) not or only hardly detectable. Once these regions are determined via the marker(s), processing spots can be assigned to them for evaluating the observations of the camera. Moreover, optical aberrations like positive or negative (pillow-shaped) distortions and/or a varying optical magnification can be detected and corrected with the help of alignment markers.

In a further development of the invention, the image processing device comprises a focusing module for changing the focus of the camera based on the at least one determined characteristic parameter. The focusing module may for example comprise an electromechanical mechanism that can shift the lens of the camera. Moreover, the focus change may especially be based on the integral of a function of the deviations of all image values from a reference value in a processing spot, for example on the standard deviation of the image values in said spot. A maximum of such a deviation-related value is typically a good indicator of an optimal focus of a target image area.

The image processing device may further optionally comprise a status indicator, for example an acoustic or optical signaling device, for signaling the detection of an exceptional state in at least one image frame, particularly of a deteriorated optical quality. Detection of such error states is important to avoid erroneous interpretations of false measurement results. A deteriorated optical quality may for example be detected via exceptional values of the aforementioned standard deviation (or, more generally, of the integrated deviations of all image values from a reference value).

The post-processing of the digital control unit may preferably comprise a temporal filtering of the characteristic parameters that have been obtained for a selected subset of the image frames. The temporal filtering can particularly comprise a band-pass or low-pass filtering, e.g. realized by averaging the characteristic parameters corresponding to the selected subset of image frames. By the filtering, certain noise components as for example un-correlated noise can be removed.

According to a further development of the aforementioned embodiment, the post-processing of the digital control unit further comprises that a temporally filtered characteristic parameter is related to the corresponding characteristic parameter that has been obtained for image frames which do not belong to the selected subset (this may typically be all residual image frames). The applied relation may particularly comprise a subtraction, i.e. the filtered characteristic parameter is subtracted from the corresponding characteristic parameter (or vice versa). Due to the filtering process, noise components can selectively be removed from the filtered characteristic parameter and will therefore play no role when the filtered characteristic parameter is related to the unfiltered one.

In the temporal filtering approach, the size and/or the position of the processing spots may be altered for the selected subset of image frames in comparison to the residual image frames. If the image frames of the selected subset shall for example capture some background or reference value, it may be advantageous to enlarge the processing spots in which the corresponding characteristic parameter is calculated.

According to a further development of the invention, the digital image processing device may further comprise a controllable illumination unit by which the exposure conditions can selectively be set for different image frames. The illumination unit may for example comprise a light source that actively illuminates the scene which is recorded by the camera, or it may control a diaphragm that determines the amount of light entering the camera. The illumination unit may be adapted to set the illumination conditions selectively for isolated image frames, i.e. to switch illumination conditions from one image frame to the next. In case of a light source, the illumination may for instance be interrupted (switched off) for every second image frame.

The aforementioned embodiment may particularly be combined with the post-processing comprising a temporal filtering on the selected subset of image frames. Different exposure conditions can then be set for the selected subset of image frames and the residual image frames, respectively. Thus it is for example possible to switch the illumination off for image frames that belong to the selected subset and that shall be temporally filtered.

The invention further relates to a method for evaluating a sequence of image frames provided by a camera, said method comprising the following steps:

a) Determining with a pixel processing unit at least one characteristic parameter of a current set of processing spots in the image area from a stream of frame values.

b) Determining a (next) set of processing spots and post-processing at least one (previous) characteristic parameter with a higher-level digital control unit.

c) Exchanging data between the digital control unit and the pixel processing unit after the pixel processing unit has completed processing of the current set of processing spots for the current frame.

The method comprises in general form the steps that can be executed with an image processing device of the kind described above. Therefore, reference is made to the preceding description for more information on the details, advantages and improvements of that method.

The invention further relates to the use of the digital image processing device described above for molecular diagnostics, biological sample analysis, or chemical sample analysis, food analysis, and/or forensic analysis. Molecular diagnostics may for example be accomplished with the help of magnetic beads or fluorescent particles that are directly or indirectly attached to target molecules.

The image processing device will typically be programmable, e.g. it may include a microprocessor or an FPGA. Accordingly, the present invention further includes a computer program product which provides the functionality of any of the methods according to the present invention when executed on a computing device.

Further, the present invention includes a data carrier, for example a ROM, a memory card, a floppy disk, a hard disk, or a compact disc (CD-ROM), which stores the computer product in a machine readable form and which executes at least one of the methods of the invention when the program stored on the data carrier is executed on a computing device.

Nowadays, such software is often offered on the Internet or a company Intranet for download, hence the present invention also includes transmitting the computer product according to the present invention over a local or wide area network.

The computing device may include a personal computer or a work station. The computing device may include one of a microprocessor and an FPGA.

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components.

An image processing architecture according to the present invention will in the following be described with respect to its application in an optical biosensor, though its use is not limited to this case.

Figure 1:
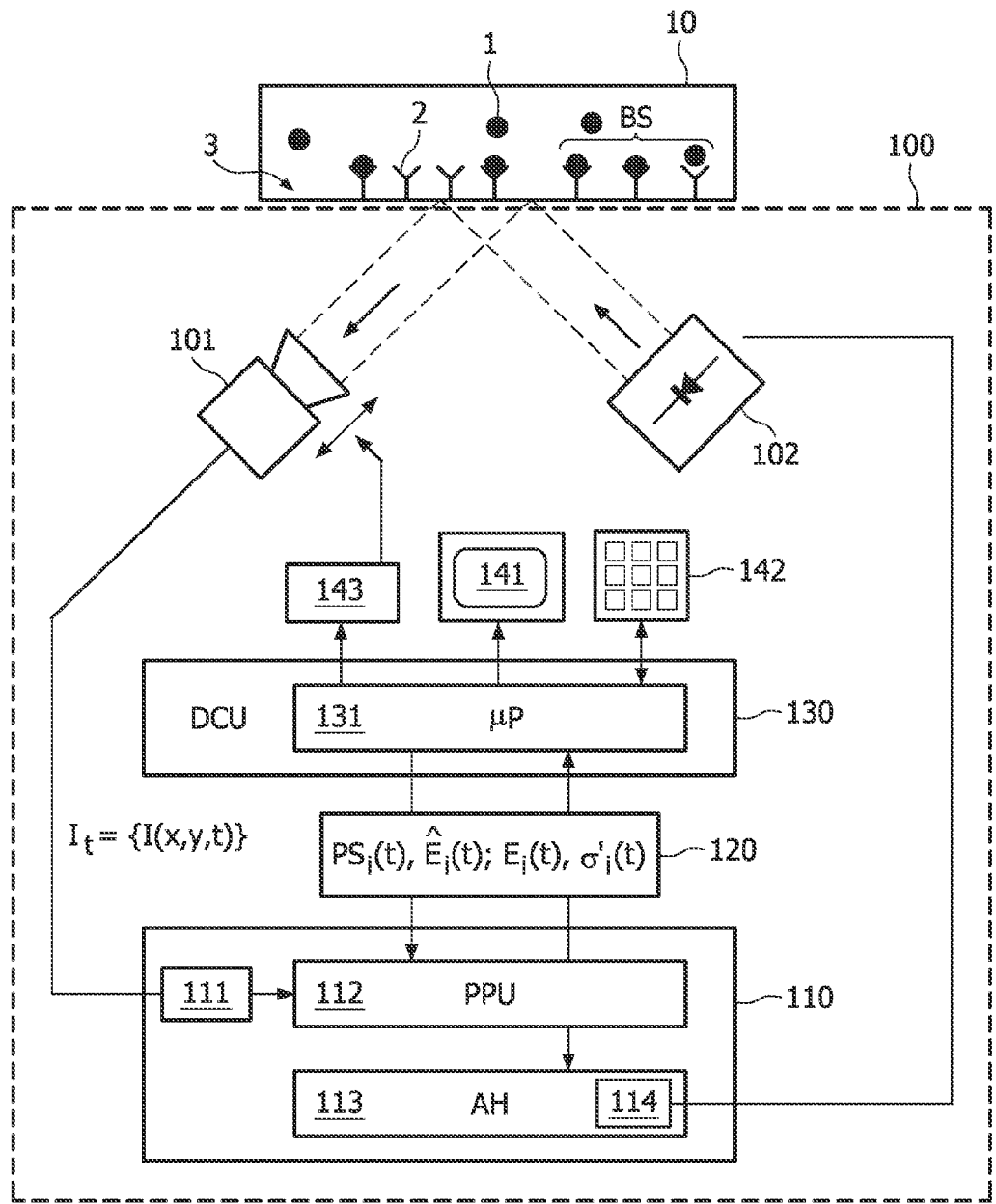
FIG. 1 shows schematically a digital image processing device according to the present invention used in an optical biosensor.

FIG. 1 shows (not to scale and in a mixed representation of logical components and hardware components) schematically a cartridge 10 of a bioassay and an associated (portable) reader 100. The disposable cartridge 10 usually comprises a biological sample (e.g. blood or saliva) containing target molecules 1 of interest that shall be detected via specific binding sites 2 on a contact surface 3. After insertion of the cartridge 10 into the reader 100, the contact surface 3 is irradiated by a light source 102, and the reflected light is continuously imaged by a (CCD) camera 101. The camera 101 may particularly be used to observe fluorescence and/or frustrated total internal reflection taking place at (occupied) binding sites on the contact surface.

Figure 2:
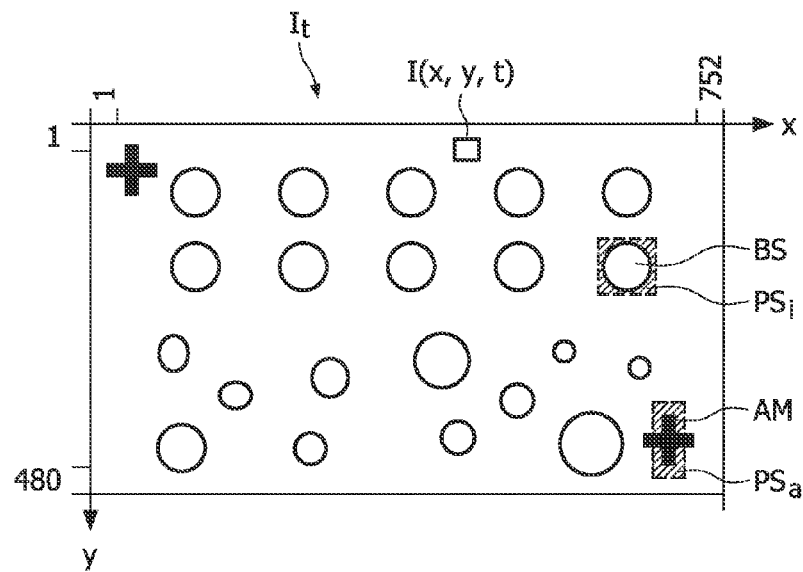
FIG. 2 illustrates an image area provided by the camera of FIG. 1.

FIG. 2 illustrates a typical image seen by the camera 101. As usual, the frame representing the image is composed of L rows (x-direction) and M columns (y-direction) of image pixels (with e.g. L=480 and M=752). Binding spots BS are distributed within the image area, said spots corresponding to regions on the contact surface 3 of the cartridge 10 which are coated with (different) specific binding molecules 2. While the binding spots are distributed regularly in the upper part of the image area, the lower part illustrates a more general, irregular distribution of sizes and positions of the binding spots. The picture is obtained by (predominantly) homogeneous illumination of the contact surface 3 and projection of the reflected light via an optical system on the camera 101. The darkening of a binding spot BS compared to the surrounding white-area is a measure for the number of bindings between binding sites 2 and target molecules 1.

FIG. 2 further illustrates two cross shaped alignment markers AM that are imprinted on or engraved into the contact surface 3 at known relative positions with respect to the binding spots BS. Due to their high contrast, the markers AM can be detected from the beginning on in every frame. Thus they can be used to precisely determine the positions of binding spots BS as long as these are not yet visible during an assay.

Moreover, two exemplary rectangular "processing spots" $PS_i$ and $PS_a$ are shown in FIG. 2 which are disposed at a binding site BS and an alignment marker AM, respectively. The first processing spot $PS_i$ is used to evaluate the measurements in the corresponding binding spot BS of the cartridge, while the second processing spot $PS_a$ is used to find the position of the associated alignment marker. As the processing spots are rectangular areas, they can be simply described by four coordinates (starting row a, starting column b, ending row c, ending column d).

It should be noted that processing spots can also be associated to "white-areas" (comprising no binding sites) for purposes of reference or calibration. Furthermore, the processing spots can optionally be restricted to sub-areas of the binding spots, thus avoiding to cover also "white areas". A circular binding spot might in this way for example be approximated by a plurality of rectangular processing spots.

The accuracy of the assignment of processing spots $PS_i$ to binding spots BS will usually be better when the alignment markers AM are more closely to the binding spots. Moreover, the binding spots BS themselves can be used, when they are visible due to e.g. binding or closely located alignment markers, in order to align the corresponding processing spots $PS_i$ more accurately.

The described alignment based on markers or based on the binding spots themselves (when visible e.g. after binding or due to the printing technique) can also be used in a real-time tracking of binding spot positions. Thus a possible mechanical displacement of the cartridge with respect to the reader, which is for example caused by touching, vibrations and shocking the cartridge in a handheld application, can for example be suppressed or at least be compensated with a continuous tracking.

In order to interpret the (bio-)chemical processes in the cartridge 10 correctly, at least ten frames $I_t$ per second must typically be processed from a 752 H×480V (CCD/CMOS) video camera. For every frame $I_t$ the average and the quality (noise) from each of the binding spots BS and of the white-areas around them must be calculated. In software this would require a lot of processing power to implement. Furthermore, the software would in many assays also have to take care of a real-time magnetic actuation-current driver (used to manipulate magnetically interactive label particles). Especially in handheld reader-devices this would take a lot of power dissipation and an expensive μP.

To address the above issues, the architecture of the reader 100 of FIG. 1 is proposed here. This architecture comprises two main components:

A "pixel processing unit (PPU)" 112 for evaluating the stream of incoming image values (pixels) I(x,y,t) with respect to a given current set of processing spots $PS_i(t)$. The pixel processing unit 112 is part of a low-level hardware module 110 which further comprises an intermediate storage 111 for image frames $I_t$ provided by the camera 101, and analogous hardware (AH) 113 with an LED driver 114 for controlling the brightness of the light source 102 of the reader.

A higher-level "digital control unit (DCU)" 130 comprising a microprocessor (μP) 131 with associated software. The digital control unit 130 reads results from the pixel processing unit 112 (e.g. the brightness $E_i$ of processing spots) and provides control data to the pixel processing unit 112 (e.g. the active set of processing spots $PS_i(t)$ to be dealt with).

The data exchange between the pixel processing unit 112 and the digital control unit 130 is preferably done via shadow registers 120 to relax time requirements. Furthermore, the digital control unit 130 is, probably via an additional PDA (=Personal Digital Assistant, not drawn), in communication with a display 141 and control buttons 142 for an interaction with a user.

The pixel processing unit 112 (e.g. a Field Programmable Gate Array FPGA) calculates during every video frame $I_t$ the integral light intensity $E_i(t)$ and the integral quality $\sigma'_i(t)$ in a multitude of predetermined areas, namely a set of processing spots $PS_i(t)$ of the kind defined above, wherein $\sigma'_i$ is a "noise" indicator that should be defined appropriately in a compromise between significance, complexity and power consumption. The pixel processing unit 112 is communicating with the software in the digital control unit 130, e.g. the μP 131 or a LabView application, which:

Calculates at start-up (after inserting the cartridge 10) the coordinates
definition and implementation not disclose yet, see first remark in this draft.
of the active pixels in the processing spots $PS_i(t)$ of a video frame $I_t$ (corresponding to bindings spots and/or white-areas) based on an obtained video frame and writes said coordinates to the pixel processing unit 112. It should be noted that this can be performed by a low-speed microprocessor, as there is no need for real-time calculation.

Collects frame-wise the integrals $E_i(t)$ and qualities $\sigma'_i(t)$ in each of said processing spots $PS_i(t)$ from the pixel processing unit 112 and calculates the average intensity/noise from these data.

Interprets for each of the processing spots $PS_i(t)$ the average signal $E_i(t)$ as a function of time t and submits an extrapolated integral value $\hat{e}_i(t)$ for the next frame $I_{t+1}$, (based on previous frames) to the pixel processing unit 112 to be used for quality measurement.

This approach offers as advantages a high throughput with the possibility of high frame-rates, a low power consumption, a low complexity (no frame-memories necessary), and a high flexibility. It comprises an optimal balance between hardware and software processing.

Figure 3:
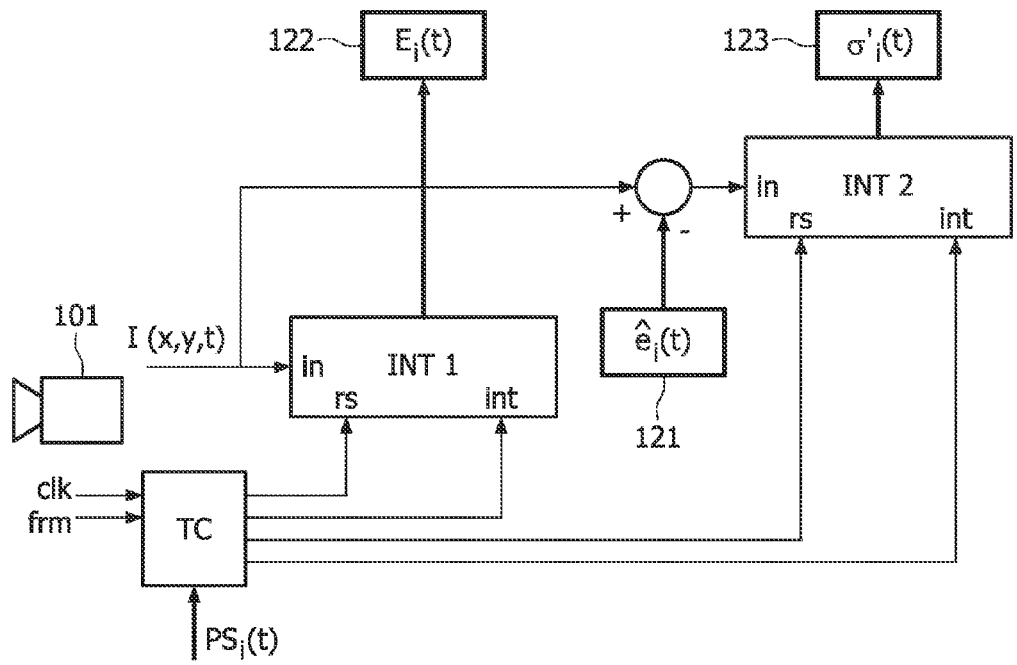
FIG. 3 shows a first architecture of a Spot Processing Block (SPB) for processing one processing spot.

FIG. 3 illustrates schematically a "Spot Processing Block (SPB)", i.e. the hardware components needed by the pixel processing unit 112 for the evaluation of a single processing spot PS, (i.e. the processing block 112 usually comprises a multitude of such SPBs operating in parallel).

From the camera 101, the stream of image values I(x,y,t) (e.g. 10b pixels) is continuously supplied to the inputs of a first integrator INT1 and a second integrator INT2 of the SPB.

A timing controller TC receives a clock signal clk (indicating a new pixel) and a frame signal form (indicating a new frame) from the camera pixel clock and the frame synchronization, respectively. Moreover, the timing controller TC is provided (at startup) with the coordinates of the current processing spot $PS_i(t)$ to be dealt with. The timing controller TC can reset the integrators INT1, INT2 at the beginning of each new frame $I_t$ (via inputs rs) and, within a frame, indicate which image values (pixels) shall be summed up or not (via inputs int).

Integrator INT1 determines the integral $E_i(t)$ of the pixel values I(x,y,t) in the processing spot $PS_i(t)$ under consideration during a video frame $I_t$ according to $$E_i(t) = 2^{-m} \sum_{p \in PS_i(t)} I(x, y, t) \qquad (1)$$

(with m being a scaling factor to adapt the result to the interface-bus-width).

Integrator INT2 determines the integral $\sigma'_i(t)$ of the noise in the processing spot $PS_i(t)$ under consideration during a video frame $I_t$ according to $$\sigma'_i(t) = 2^{-m} \sum_{p \in PS_i(t)} |I(x, y, t) - \hat{e}_i(t)|. \qquad (2)$$

Here $\hat{e}_i(t)$ is the extrapolated value of the average intensity per pixel, which is calculated from previous frames (not necessarily the last video frame) by the software in the digital control unit 130 and provided in a so-called "shadow register" 121.

No further attempt is made to calculate the exact average values, as this can easily be performed in the software and would only cost needless complexity and power consumption. It should be noted that $\sigma'_i$ of formula (2) is based on the absolute noise and is not the standard-deviation. Other definitions for a noise indicator could be used as well. At the cost of more hardware/power, the pixel processing unit 112 might for example calculate a sum of squares instead of absolute values (| . . . |) according to the following formula:

$$\sigma'_i(t) = 2^{-m} \sum_{p \in PS_i(t)} (I(x, y, t) - \hat{e}_i(t))^2, \qquad (3)$$

so that the digital control unit 130 could calculate the standard deviation (RMS value).

Both inputs of SQ must be connected to implement squaring functionality.

Figure 4:
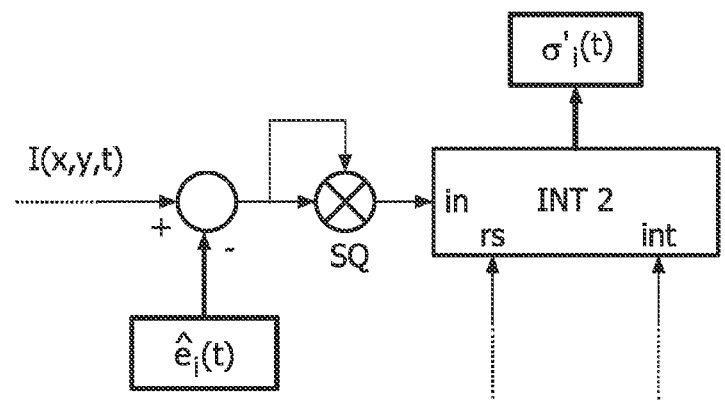
FIG. 4 shows a modification of the SPB for calculating a standard deviation.

FIG. 4 shows the associated modified part of the Spot Processing Block, which now comprises an additional multiplication SQ to determine the square. If nothing else is said, both definitions (2) or (3) may in the following be applied for $\sigma'_i$ (wherein the drawings of the SPBs usually illustrate formula (2)).

The results $E_i(t)$ and $\sigma'_i(t)$ are communicated on a low-frequency frame rate (typically 30 frames/s) with the software in the digital control unit 130. When a frame $I_t$ is finished, the results are stored in shadow registers 122, 123 in order to set no unrealistic demands on communication speed. In this way frames rates up to 60 Hz can be achieved, without setting large demands on the processing.

Figure 5:
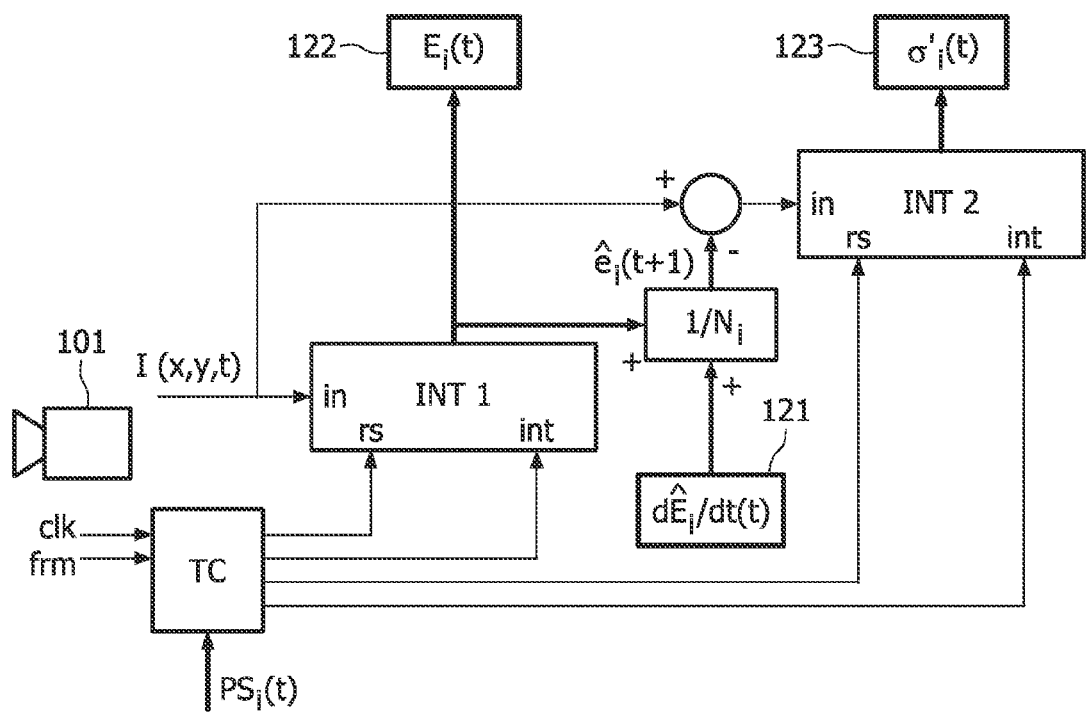
FIG. 5 shows a second SPB architecture for processing one processing spot using the estimated slope of the spot brightness.

FIG. 5 illustrates an alternative embodiment of a SPB for the evaluation of a single processing spot $PS_i$. In this case, the software in the digital control unit 130 estimates the slope $d\hat{E}_i/dt(t)$ (increment per frame) of the integral $E_i$ over time, and writes this to a shadow register 121. At the end of each video frame $I_t$, the estimated slope $d\hat{E}_i/dt(t)$ is added to the output $E_i(t)$ of the first integrator INT1 and used, after dividing it by the number $N_i$ of pixels involved, as the estimated value $\hat{e}_i(t+1)$ for the next frame $I_{t+1}$.

This approach can be beneficial because there is no need to read, process and write data between two video frames.

A further development of the invention that will be described next relates to the fact that a multitude (typically in the order of 25) of binding spots BS is needed in particular applications for e.g. robustness improvement or to detect many different target molecules. Furthermore, the processing spots may not be regularly spread on a rectangular grid due to production (spotting) tolerances and/or an intentional optimization of the binding process for a given actuation (coil) profile.

The aforementioned issues are solved by dividing the camera frame area in "stripes", which comprise a number of N processing spots with associated "Spot Processing Blocks (SPB)" in the pixel processing unit. Shadow registers are used to store the results, the coordinates for the next stripe, and the predicted value needed for noise measurement. When a stripe is finished, its results are stored in the shadow registers and the coordinates and the extrapolated pixel value for each of the binding spots for the next stripe are loaded. This relaxes the timing requirements for the software.

In an even more flexible approach a pool of SPBs is used, each of them communicating with the micro-controller in the digital control unit DCU individually on interrupt basis. The software in the DCU assigns the individual SPBs to the binding spots, furthermore optimizing the timing requirements. It is then possible to process a "mushroom culture" of randomly located bindings spots of random size.

Figure 6:
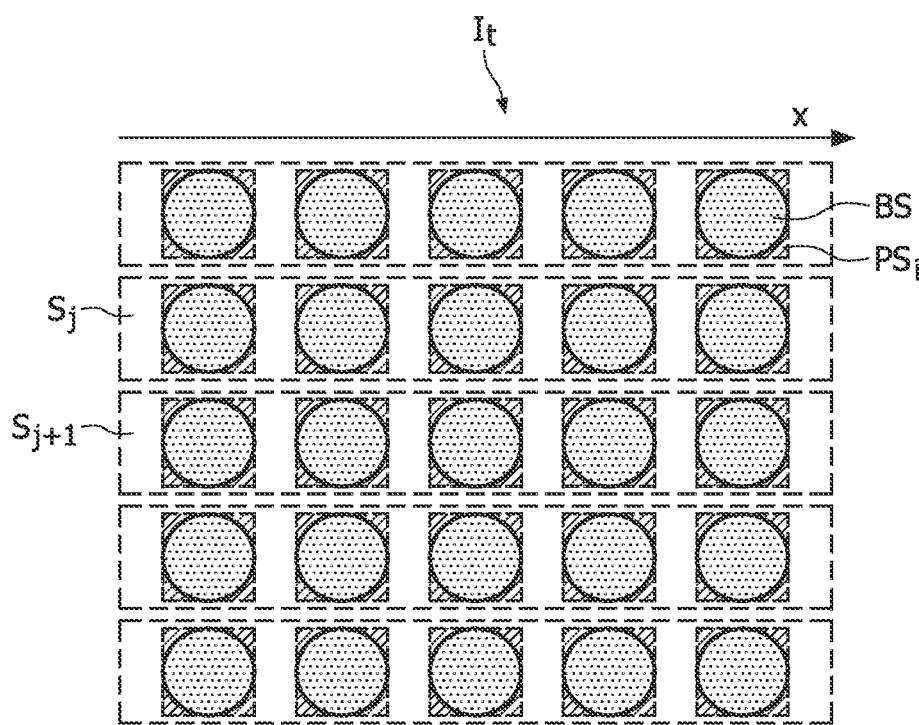
FIG. 6 illustrates an image area with a regular pattern of binding sites that is subdivided into stripes.

FIG. 6 illustrates the above concepts for a video frame $I_t$ that is divided in five "stripes" $S_j$ (j=0, . . . 4). Each stripe $S_j$ comprises a multitude of binding spots BS (in which the binding of the bioassay is expected to take place) and associated processing spots $PS_i$.

The pixel processing unit 112 that receives a stream of image values I(x,y,t) from the video camera 101 (cf. FIG. 1) now calculates at a time only for a part of a video frame $I_t$, i.e. during a "stripe" $S_j$, the integral light intensities $E_i(t)$ and noises $\sigma'_i(t)$ in a multitude of processing spots $PS_i(t)$. For this purpose a plurality of Spot Processing Blocks (SPBs) is present in the pixel processing unit 112, each of them able to select a processing spot $PS_i$ inside the corresponding stripe $S_j$ and to calculate the above mentioned parameters. Communication with the software in the digital control unit 130 is stripe-wise organized.

Figure 7:
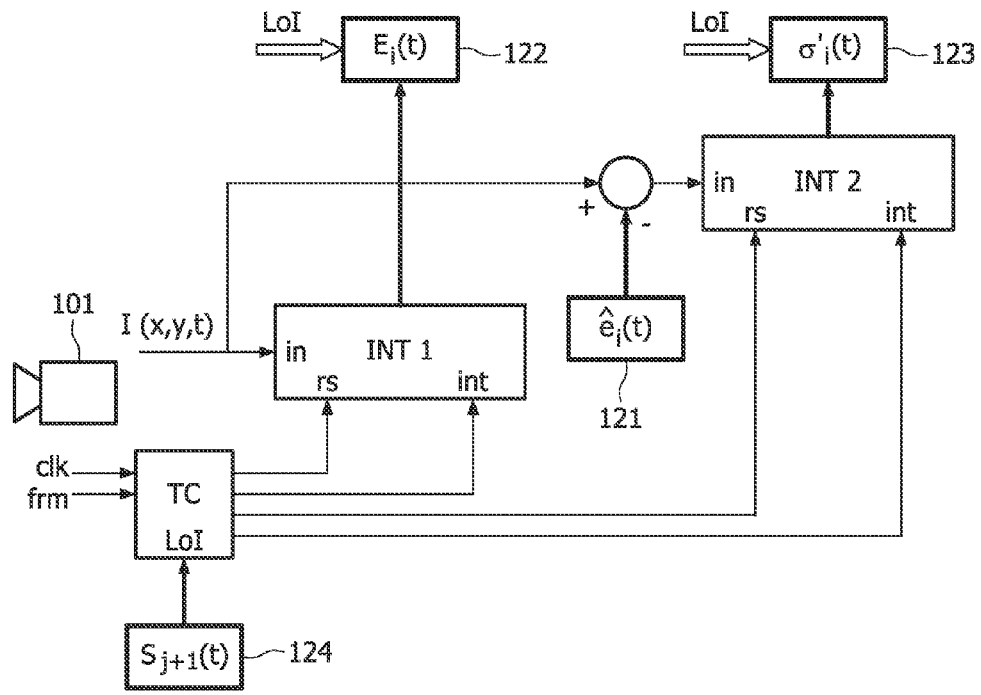
FIG. 7 shows a third SPB architecture for processing one processing spot in the situation of FIG. 6.

FIG. 7 shows the corresponding block diagram of a SPB associated to a given processing spot $PS_i$. The SPB timing goes as follows:

1. Calculate stripe-wise the sum (integrals) $E_i(t)$ and $\sigma'_i(t)$ according to equations (1) and (2) in the corresponding processing spot $PS_i$.
2. When a stripe $S_j$ is finished, the results $E_i(t)$, $\sigma'_i(t)$ are stored in shadow registers 122, 123 and the coordinates of the binding spots in the next stripe $S_{j+1}$, are copied from its shadow register 124.
3. Until the end of the next stripe $S_{j+1}$, the software in the digital control unit 130 gets time to communicate with the shadow registers 121-124 for: reading the results $E_i(t)$ and $\sigma'_i(t)$, storing the next estimated values $\hat{e}_i(t)$, and storing the coordinates of the next stripe $S_{j+2}$.

Figure 8:
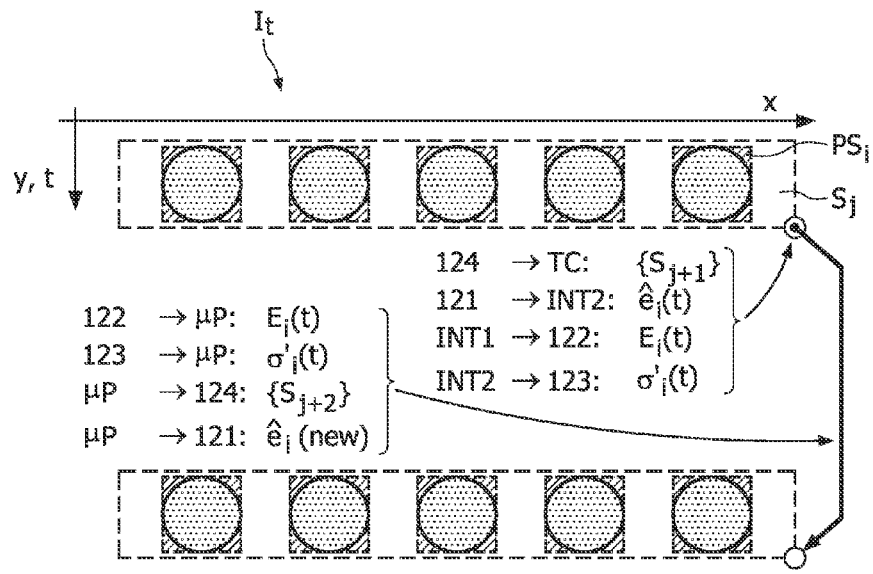
FIG. 8 illustrates the temporal data flow in the third SPB architecture.

FIG. 8 illustrates this timing schedule with respect to the image of processing spots $PS_i$.

Figure 9:
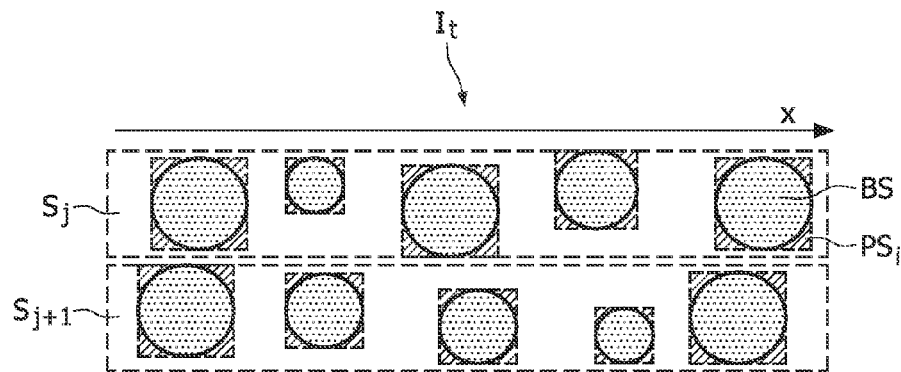
FIG. 9 illustrates an image area with an irregular pattern of binding sites.

In spite of the fact that the above approach is pretty flexible, its use is limited to the vertical alignment of the binding spots (because otherwise the stripes become too high). The worst-case situation is shown in FIG. 9.

Figure 10:
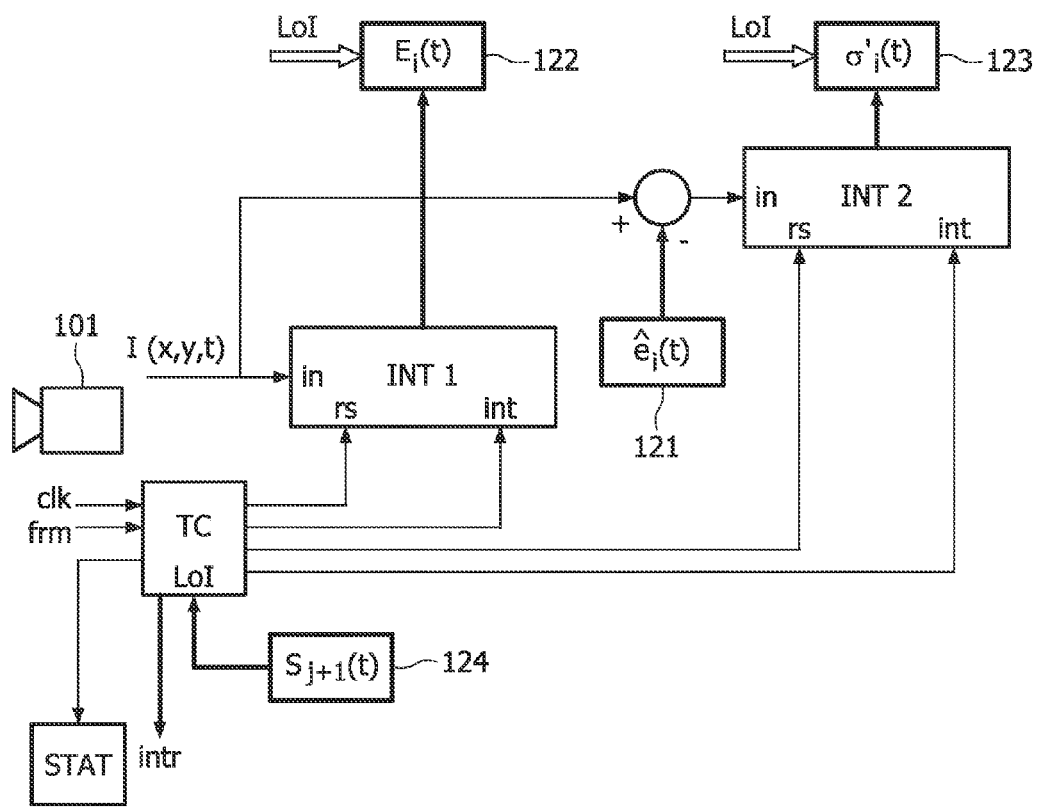
FIG. 10 shows of fourth SPB architecture for processing one processing spot in the situation of FIG. 9.

FIG. 10 illustrates a Spot Processing Block that can deal with such cases. To this end, it is proposed to let each SPB communicate individually with the software in the digital control unit 130 on interrupt basis.

After finishing processing of a processing spot $PS_i$, results $E_i$, $\sigma'_i$ and new data $\hat{e}_k$, $PS_k$ are communicated with the shadow registers 121-124 by the hardware. Furthermore, the status "ready" is written to a status register STAT at position i and an interrupt intr is generated by the timing controller TC. After this, the software in the digital control unit 130 is allowed to communicate (read results, load new data) until the end of the current processing spot $PS_k$. In order not to overload the micro processor with too many interrupts, the implementation is such that only one interrupt per video line is generated, where the contents of STAT indicates which spot is ready.

Figure 11:
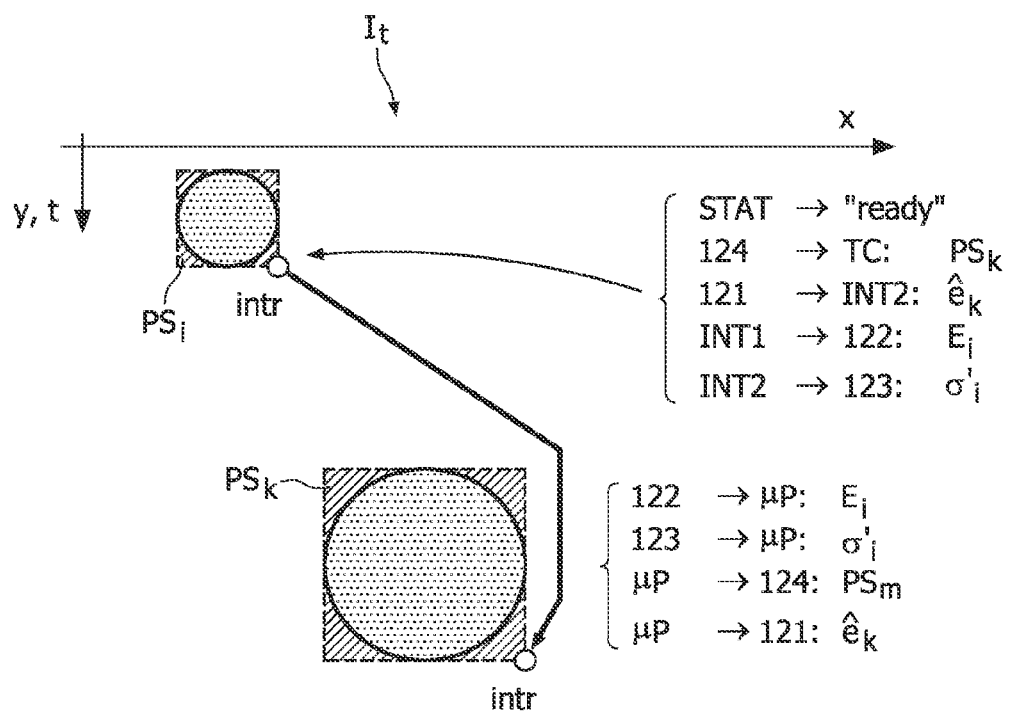
FIG. 11 illustrates the temporal data flow in the fourth SPB architecture.

FIG. 11 illustrates the timing schedule with respect to two processing spots $PS_i$ and $PS_k$.

The assignment of processing spots $PS_i$ to SPBs is realized in the software running on the digital control unit 130. Depending on the position of the binding spots, the most timing-optimal SPB assignment scenario can be chosen to minimally interfere with other "real-time" tasks (e.g. display, control buttons) of the software.

The described architecture is able to detect multi-spots of random size and at random positions, like the mushrooms in a mushroom culture. Further advantages of the architecture are:

only low speed micro-controller needed, as all communication is on frame·N rate basis (N=number of stripes of one frame);
high throughput, high frame-rates achievable
low power consumption
low complexity (no frame-memories)
flexibility.

A further development of the invention that will be described next relates to the fact that the position of the binding spots BS in the camera picture $I_t$ may shift from measurement to measurement or even during one measurement due to mechanical tolerances in the cartridge 10 and in the reader device 100. In general, it is possible to apply a trace-back (compensation) technique to the measured data when after binding the binding spots become visible and it becomes clear that there is a (static) misalignment between their actual and their assumed positions, dimensions, and/or shapes.

In an approximative trace-back procedure, one can use the integrator values (not the complete frames) to trace back. This requires virtually no extra memory as all the data (integer values) are already stored in the microprocessor. Depending on the known shape of the spots the compensation can then take place.

To make a trace-back exact, it would however be necessary to store all previous image frames, which requires a huge video storage that is usually not available in a low-power handheld reader-device. In order to interpret the (bio-)chemical binding processes correctly, it is therefore preferred that the position of the binding spots is known before they are visible in the camera picture (i.e. prior to the assay).

To achieve the aforementioned objectives, the position of said binding spots can be related to the position of so-called alignment markers.

It would be possible to use the micro-processor (micro-controller) in the reader device to recognize said markers. However, this would set serious demands on the memory capacity and the transfer rate of said micro-controller. It is therefore desirable to relax the micro-processor requirements in terms of power consumption, bus transfer rate, processing power and price.

To this end the video camera 101 connected to the pixel processing unit 112 (cf. FIG. 1) is used to calculate during every video frame $I_t$ the integral light intensity $E_a$ in a multitude of processing spots $PS_a$ corresponding with the alignment marker(s) on the cartridge 10. The associated software in the digital control unit 130 then 1. collects frame-wise the integrals $E_a$ in the processing spots $PS_a$ that shall correspond to the alignment markers;
2. optimizes via an iterative process said integrals by controlling the position of the processing spots $PS_a$ during consecutive video frames;
3. calculates, when the optimization has finished, the coordinates of new processing spots $PS_i$ corresponding with the binding spots BS and starts detection as explained above.

Figure 12:
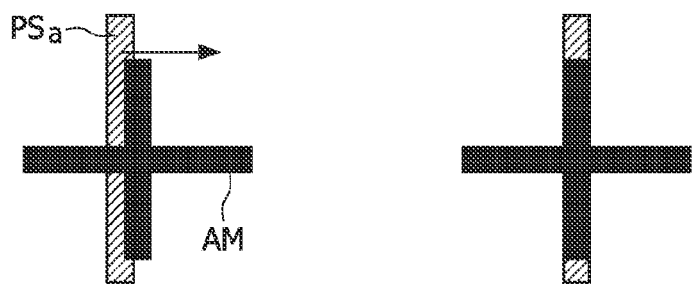
FIGS. 12 to 16 illustrate various embodiments for the detection of alignment markers in an image based on the brightness of associated processing spots.

FIG. 12 shows the camera picture for one alignment marker AM and a vertical oriented, rectangular processing spot $PS_a$ before (left) and after (right) optimization. Horizontal alignment of the processing spot $PS_a$ is performed by changing the position of a pre-determined area until it fits perfectly with the vertical line of the alignment marker AM by e.g. minimizing the integrated pixel values $E_a$ in said area.

Figure 13:
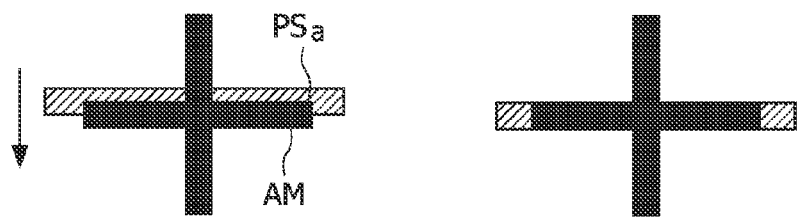

According to FIG. 13, horizontally oriented processing spots $PS_a$ analogously offer vertical alignment information.

It should be noted that in this configuration also horizontal alignment can be optimized during vertical alignment, obviously when the processing spot width is smaller or equal to the width of the alignment marker AM.

Figure 14:
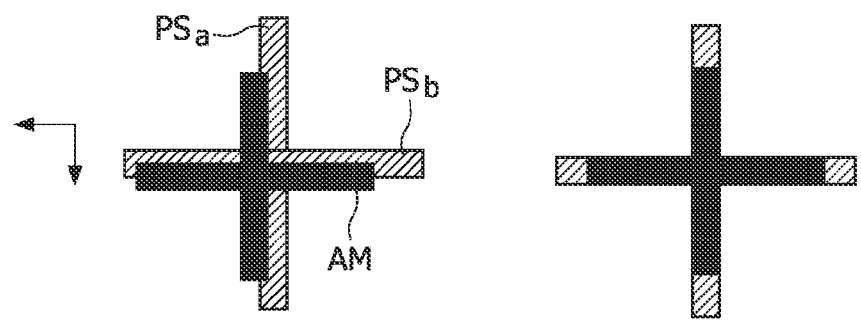
Figure 15:
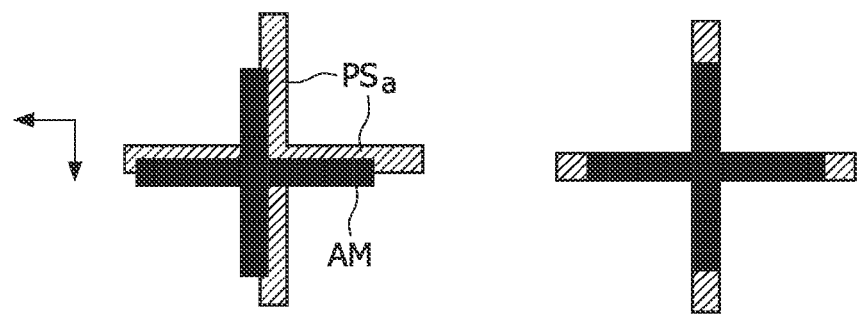

A mixed horizontal-vertical alignment can be performed as indicated in FIG. 14 by using two processing spots $PS_a$, $PS_b$, or by using a single "cross-shaped" processing spot $PS_a$ according to FIG. 15.

In the above scenarios, the software in the digital control unit 130 of FIG. 1 may align at start-up (after the cartridge 10 is inserted) the position of processing spots $PS_a$ (corresponding to the alignment markers AM) via an iterative process until said spots fit optimal with the alignment markers. This optimization may be based on the integrated pixel values $E_a$ in said processing spots $PS_a$ calculated in the pixel processing unit 112 as explained above (e.g. FIG. 3).

Figure 16:
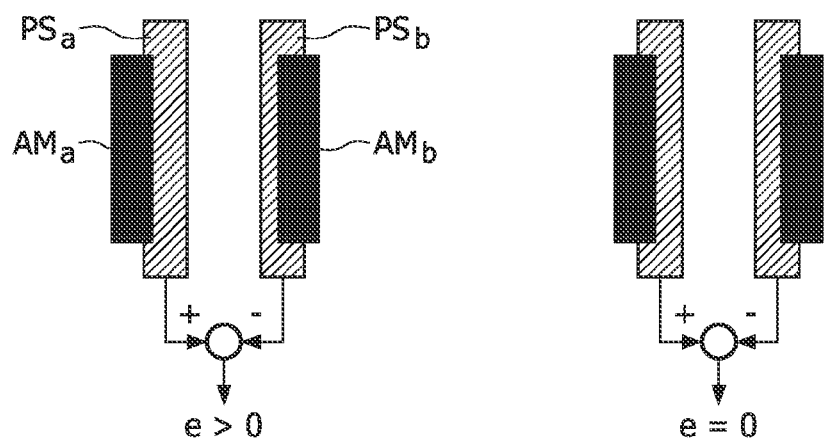

To speed-up the alignment process, sign information can be added to the optimization loop by using two alignment markers $AM_a$, $AM_b$ and two coupled processing spots $PS_a$, $PS_b$ as shown in FIG. 16. Subtracting the integrated pixel values $E_a$ and $E_b$ in said two processing spots generates a signed position error e, which speeds-up the acquisition process.

Obviously horizontal markers could be used analogously for a vertical alignment.

Many variations of the described approach are possible, for example:

Additional "white-areas" outside the alignment markers AM may be used to normalize the marker-signals and to normalize/stabilize the optical transfer comprising LED output, lenses, cartridge reflection and camera.

The number of pixels (area) used in a processing spot $PS_a$ may be varied to ease acquisition and overcome mechanical tolerances. E.g. at start, a relatively large area may be used to make sure that the alignment marker is inside the processing spot $PS_a$. After reasonable acquisition has achieved, the area may be decreased to optimize the SNR of the control loop.

Other alignment marker geometries are possible, e.g. to generate push-pull and sum-signals for fast acquisition. Thus circle-shaped alignment markers could for example be used in combination with four rectangular processing spots each to detect horizontal and vertical displacements.

An adaptation of the processing spots in size and/or shape may be used to detect optical aberrations that affect the image locally or globally, which can then be corrected for.

In the following, the problems of picture quality and focus in the described digital image processing device (FIG. 1) will be addressed. The optical image of the cartridge 10 needs to be unambiguously assessed for reasons of picture quality (focus) check of the optical system during, before, and/or at the end of an assay or during a calibration cycle;

alignment of the reader 100 during production and calibration.

As already mentioned, the transfer of a video frame to an external computer or to a handheld LCD screen is too slow for real-time assessment due to low bus transfer rates and the large amount of pixels. Furthermore visual inspection is not unambiguous. A fast and unambiguous measurement for picture quality and focus is therefore needed.

It is proposed here to use the brightness $E_i(t)$ of the processing spots and its deviation $\sigma'_i$ according to the above formulas (1) and (3) (or (2)) calculated in real-time by the SPBs as a focus and/or quality indicator. In particular, the $\sigma'_i$ value can be used to optimize focus and position, whereas the absolute value of $$\sigma'_i \text{ or } \frac{\sigma'_i}{E_i} \text{ or } \left(\frac{\sigma'_i}{E_i}\right)^2$$

is indicative of the number and the clustering of nano-particles at the cartridge surface and of dust in the optical system. By varying the position and dimensions of the pre-determined processing spots, spatial information (dimensions, position) of the focus and dust is gained. This will now be explained in more detail.

Figure 17:
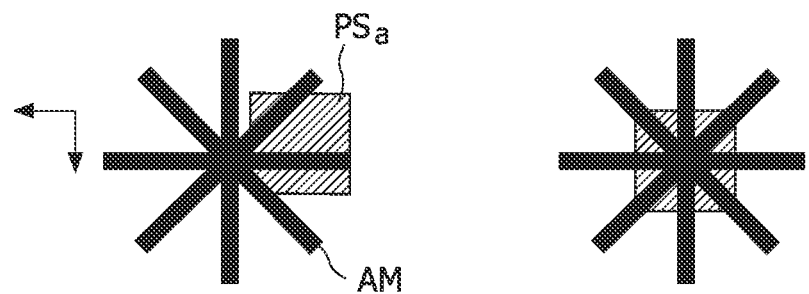
FIGS. 17 and 18 illustrate two embodiments for the detection of alignment markers in an image based on the standard deviation in associated processing spots.

As the $\sigma'_i$ value is indicative of intensity deviations from the average intensity, it achieves its maximum at optimal focus. Therefore this value can be used to align focus at production, during an assay, or during calibration. Optimum focus is achieved when the noise power $\sigma^2$ is maximal. In that case the optical transitions are most visible. Either the alignment markers discussed above or additional optimized alignment markers AM as shown in FIG. 17 are well suited to give a direct measure for the focus quality at their respective positions. Even dust or nano-particles present at the surface can be used to optimize focus by maximizing $\sigma'_i$ on them. Furthermore, the sharpness (deviation $\sigma'_i$) of a binding spot can be used as a focus indicator as well after binding took place (i.e. at the end of an assay). In a preferred embodiment, the deviation $\sigma'_i$ can be used as an error signal for an adaptive focusing module 143 (FIG. 1) using a mechanical actuator or other means to adapt focus.

Additionally, on a white area (where no particles are present), the absolute value of $\sigma'_i$ or $\sigma'_i/E_i$ gives a direct measure of the cleanness of the total optical system, including the cartridge. On well defined structures (e.g. alignment markers), the cleanness can also be obtained by correcting for the effect of said structures. The determined cleanness can then be used as a quality measure to block (or to warn) the user for further measurements due to poor optical quality. A warning can be signaled via an appropriate optical or acoustic status indicator, e.g. the display 141.

Moreover, the deviation value $\sigma'_a$ can be used as a tracking indicator in alignment procedures like that of FIGS. 12 to 16 by optimizing the position of a processing spot $PS_a$ towards a maximum value of $\sigma'_a$. The principle of operation is shown in FIG. 17. A correct alignment (right) is achieved when the centers of the alignment marker AM and the processing spot $PS_a$ correspond with each other. In that case a maximum number of optical transitions is present, yielding a maximum value of $\sigma'_a$. Obviously this embodiment can be extended to alternative alignment marker geometries, e.g. those of FIGS. 12 to 16.

As already mentioned, the absolute $\sigma'_a$ value or $\sigma'_a/E_a$ at optimal focus and at optimal position of the processing spot $PS_a$ is indicative of the dust present in the optical system. This is based on the assumption that the alignment markers are well defined and that their effect on $\sigma'_a$ value or $\sigma'_a/E_a$ can be corrected.

Figure 18:
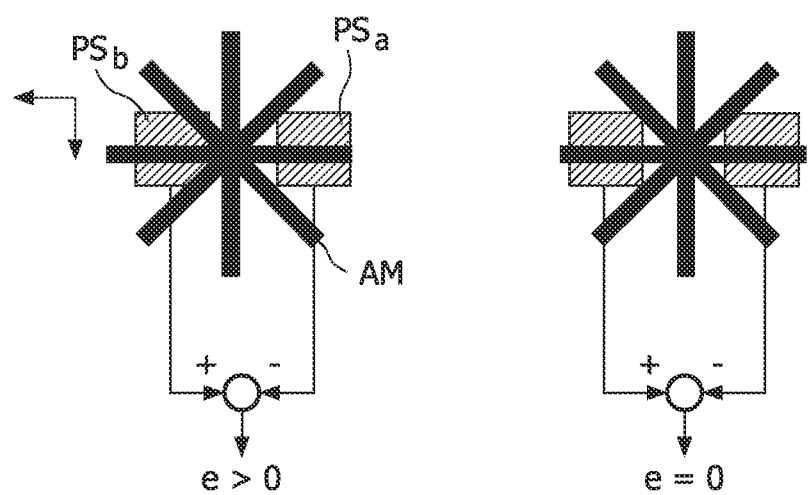

FIG. 18 shows an example where by subtracting the $\sigma'_a$ and $\sigma'_b$ values from two processing spots $PS_a$ and $PS_b$ a signed version of the position signals is derived.

In another embodiment the $\sigma'_i$ value can be used to detect the presence of clusters of magnetic particles. By attracting magnetic particles from the sample chamber of the cartridge 10 towards the surface 3 (FIG. 1), the $\sigma'_i$ value is larger for single magnetic particles than for clusters. By varying the dimensions and position of the processing spots, the size and position of said magnetic particles and clusters can then be determined.

The invention further comprises an approach to deal with signal deterioration by a low-frequency (e.g. DC) background and an additive un-correlated noise. The detected signal may for instance be disturbed by low-frequency spurious background light and (fluctuating) dark current of the camera. This effect is more severe when the detected signal is small.

Suppressing a disturbance by subtracting a reference signal is possible but would decrease the signal-to-noise ratio for the remaining un-correlated noise by at least 3 dB because of the subtraction of two noisy signals. The same holds for using a reference signal from a white area for stabilizing (normalizing) the detection gain. It is therefore desirable to provide means to correct for said errors without adding extra noise and extra costs for the optical-mechanical components (e.g. the camera).

This objective can be achieved by frame-wise modulating a light source to at least two intensities, frame-wise determining a response $E_i$ in at least one processing spot $PS_i$ for each of the intensities, and subtracting a filtered version of at least one response to suppress said additive errors without decreasing the signal-to-noise ratio for un-correlated noise. The filtering should be optimized to allow passing of the background signal, while maximally suppressing the un-correlated noise.

Figure 19:
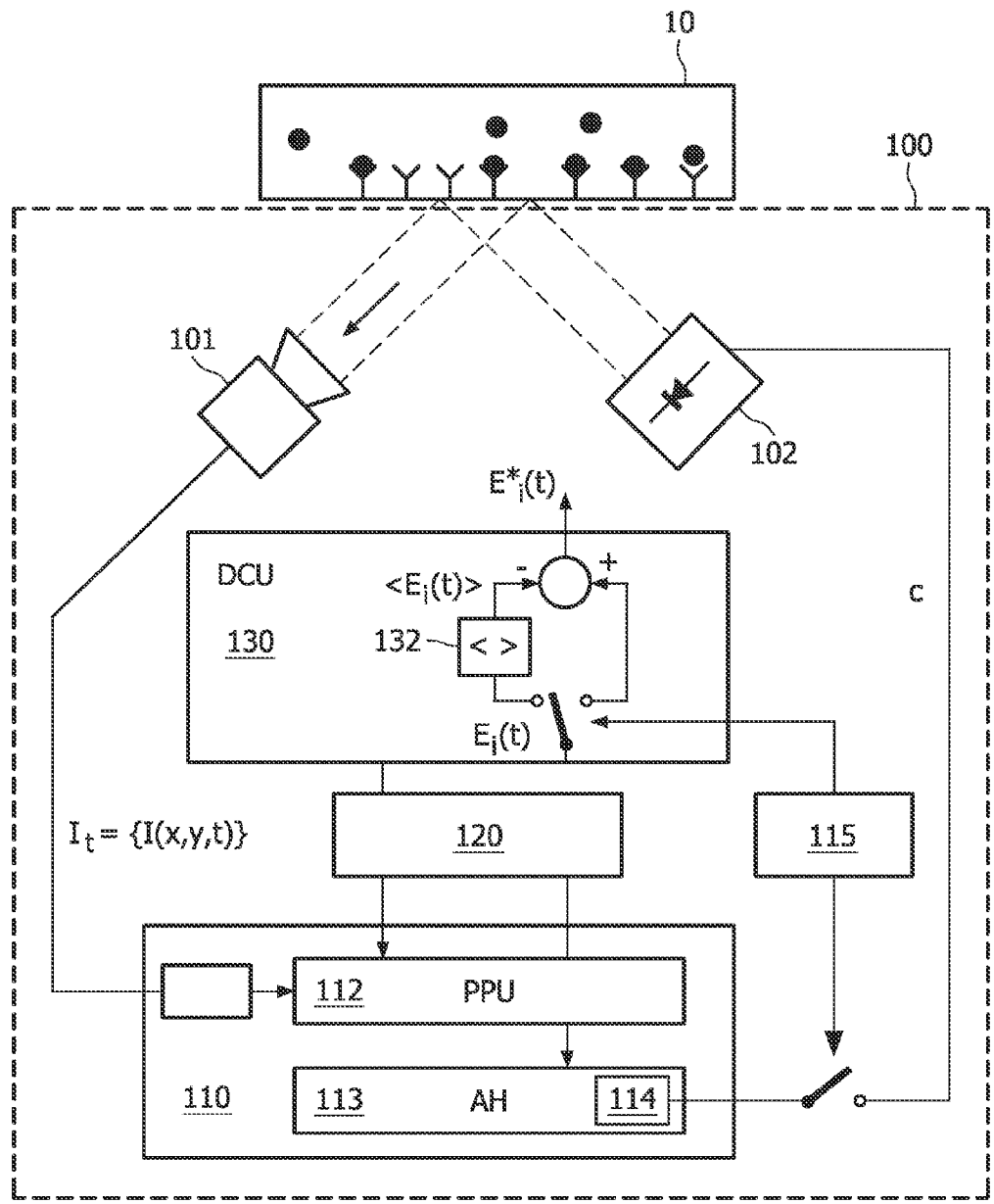
FIG. 19 shows schematically a modified digital image processing device with which a subset of dark image frames can be generated and processed.

FIG. 19 illustrates a modification of the reader 100 of the digital image processing device that implements the aforementioned concepts. The cartridge 10, the camera 101, the light source 102, the low-level hardware module 110, and the shadow registers 120 are essentially the same as in FIG. 1 and will therefore not be described again. Moreover, the monitor 141, the keypad 142, and the focusing module 143 have been omitted for clarity. The reader 100 of FIG. 19 differs from that of FIG. 1 in that it comprises a modulator 115 and that the digital control unit 130 internally realizes the filtering process described above.

The modulator 115 controls the light source 102, for example by repetitively opening and closing a switch. Thus an alternating sequence of bright and dark image frames is generated, wherein the "bright image frames" shall correspond to a situation in which the cartridge 10 was illuminated (light source 102 "on"), while the "dark image frames" correspond to camera pictures of the not-illuminated cartridge 10 (light source 102 "off").

The dark image frames constitute a selected subset of all image frames that is temporally filtered in the digital control unit. This is illustrated by a switch in the digital control unit 130 that is operated by the modulator 115 and sends all brightness values $E_i(t)$ of the mentioned subset to an averaging filter 132. The filtered brightness $<E_i>$ of the dark image frames is then subtracted from the unfiltered brightness $E_i$ of the bright image frames to yield the background corrected output value $E^*_i(t)$.

Figure 20:
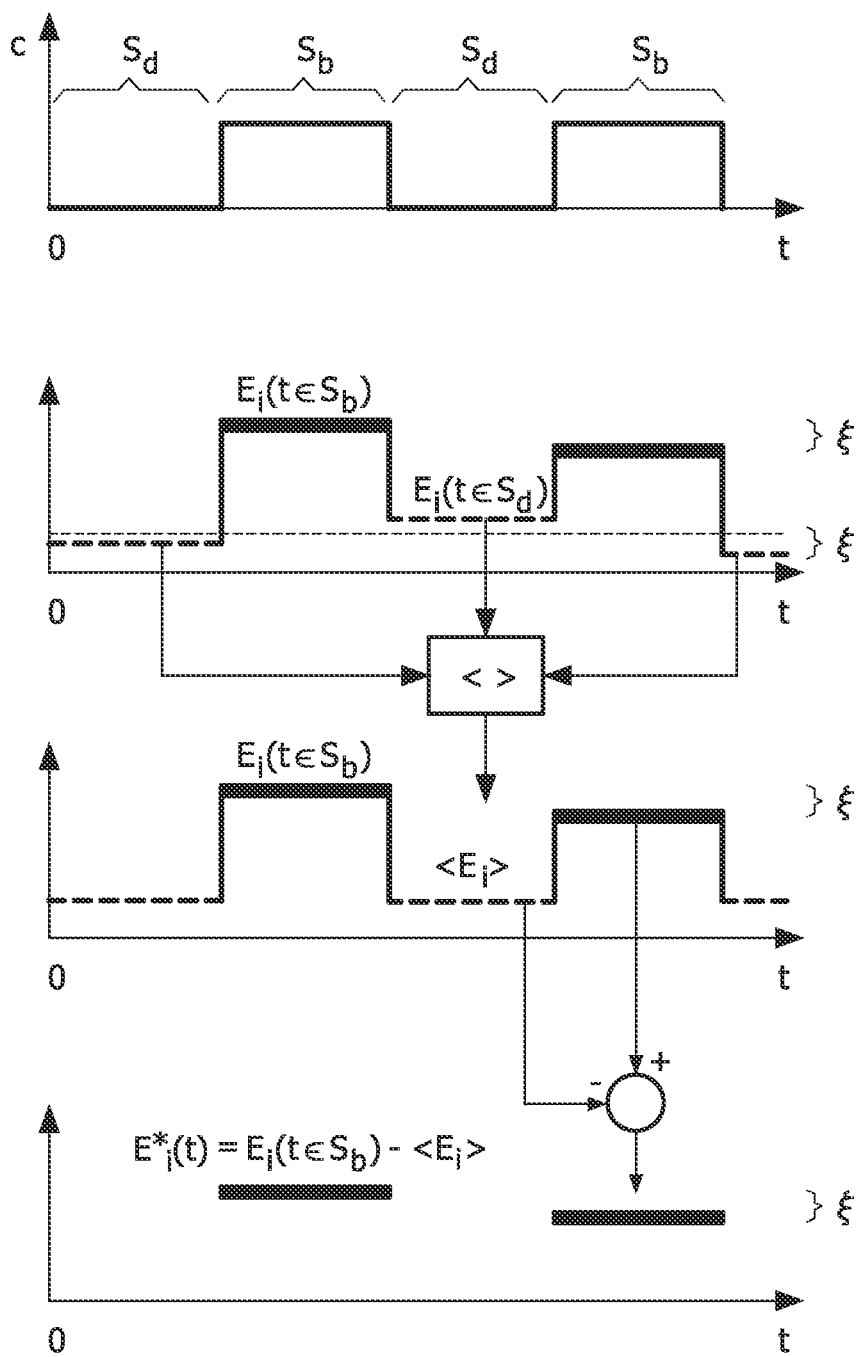
FIG. 20 illustrates the processing of the brightness obtained for one processing spot under different illumination conditions.

FIG. 20 illustrates the corresponding signals in the time-domain. The upper diagram shows the control signal c from the modulator 115 to the light source 102, in which bright periods $S_b$ alter from frame to frame with dark periods $S_d$.

The raw signals $E_i$ originating from the bright and dark frames are shown in the second diagram. They both comprise a low-frequency (here indicated as a DC) background signal plus additive un-correlated noise $\xi$.

In the third diagram, the signals of the dark image frames have been averaged to yield the filtered value $<E_i>$ which is free of the un-correlated noise $\xi$.

In the bottom diagram, the filtered value $<E_i>$ has been subtracted from the bright image frame values to yield the output value $E^*_i(t)$. By first averaging the dark frames, their noise is not added to the compensated signal, whereas the background signal is passed trough. This method avoids the SNR degradation as mainly the frequency spectrum of the correlated background is subtracted, instead of also adding non-background related, un-correlated noise.

Filtering may be performed as mentioned by averaging the values $E_i$ of dark frames. The filter may also comprise (adaptive) high-pass or band-pass sections, comb-filter structures etc. to pass e.g. 50 Hz, 100 Hz disturbance from electrical lighting or EMC. Furthermore, during the dark frames the processing spot may optionally be enlarged beyond the binding spot area in order to further decrease the noise.

Inserting dark frames decreases the effective number of bright frames to be used for the assay or alignment control, but this is tolerable. The ratio dark frames vs. bright frames can be varied depending on the spectral content of the background signal to be compensated for. Additionally, the dark frames may be only applied prior or after the effective binding process, in order to compensate for the background in advance or afterwards.

In order to calibrate the (optical, electrical) gain in the system, a "white-reference" can be used for normalization or reference. Dedicated areas on the cartridge are then made "white", i.e. independent of the amount of bindings or of magnetic particles. The detected signal from such white areas is used to normalize the white-level (illumination, optical transfer, camera gain) in the system. This white-reference can first be (low-pass) filtered in the described way prior to subtraction or normalization. This again suppresses the SNR decrease due to addition of un-correlated noise.

When a bioassay is performed with the reader 100 of FIG. 1 or 19, the following steps are typically made before starting the assay and after inserting the cartridge 10:

1. Checking the focus of alignment markers AM (e.g. with the procedures described with respect to FIGS. 17 and 18).
2. Checking the binding areas for the presence of dust or dirt (e.g. with the procedures described with respect to FIGS. 17 and 18).

By slightly displacing the cartridge 10, it can be checked if such dust or dirt is present on the cartridge 10 itself or in the optical lightpath (camera etc.).

If an error is found in these procedures, the measurement will usually be discarded.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A digital image processing device for real-time evaluation of a sequence of image frames provided by a camera comprising:
   a memory;
   a digital pixel processing unit configured to determine characteristic parameters of a set of processing spots in an image area from a stream of image values, and store the characteristic parameters in the memory; and
   a digital control unit in communication with the pixel processing unit, wherein the digital control unit is configured to set the set of processing spots for use by the digital pixel processing unit for determining the characteristic parameters of the set of processing spots, and wherein the digital control unit is further configured to read out from the memory and post-process the characteristic parameters determined by the digital pixel processing unit.

2. The image processing device according to claim 1, wherein the processing spots relate to a rectangular image region.

3. The image processing device according to claim 1, wherein the set of processing spots comprises a single processing spot only, a plurality of processing spots from an image stripe ($S_j$), and/or a plurality of processing spots from the whole image area.

4. The image processing device according to claim 1, wherein the characteristic parameters comprise an integral of a function of deviations of the image values from a reference value.

5. The image processing device according to claim 4, wherein the digital control unit is further configured to determine a changing rate of the reference value based on characteristic parameters of previous frames.

6. The image processing device according to claim 1, wherein the memory comprises at least one shadow register for storing data to be exchanged between the pixel processing unit and the digital control unit.

7. The image processing device according to claim 1, wherein the digital control unit is further configured to set the set of processing spots once before the evaluation of a sequence of frames, at a beginning of each frame, at a beginning of a sub-frame, and/or on demand of the pixel processing unit.

8. The image processing device according to claim 1, wherein the digital control unit is further configured to iteratively adapt at least one processing spot to an image position of a marker.

9. The image processing device according to claim 1, further comprising a focusing module configured to change a focus of the camera based on the characteristic parameters including based on a function of a deviation of all image values from a reference value in a processing spot.

10. The image processing device according to claim 9, wherein the focusing module is further configured to obtain a desired focus based on a maximum value of the deviation.

11. The image processing device according to claim 1, further comprising a status indicator for signaling detection of an exceptional state in at least one image frame including detection of a deteriorated optical quality.

12. The image processing device according to claim 1, wherein the post-processing of the digital control unit is further configured to perform temporal filtering the characteristic parameters that have been obtained for a selected subset of the image frames by the digital pixel processing unit.

13. The image processing device according to claim 12, wherein the filtered characteristic parameters subtracted from corresponding characteristic parameters obtained for image frames that do not belong to the selected subset.

14. The image processing device according to claim 1, further comprising a controllable illumination unit configured to selectively set exposure conditions for different image frames.

15. The image processing device according to claim 1, wherein the digital control unit is further configured to set the set of processing spots in response to a demand of the pixel processing unit.

16. A method for evaluating a sequence image frames($I_t$) provided by a camera comprising the acts of:
   determining by a digital control unit a set processing spots in an image are from a stream of image value;
   determining by a pixel processing unit at least one characteristic parameter of the set of processing spots set by the digital control unit;
   storing the at least one characteristic parameter in a memory;
   post-processing the at least one characteristic parameter by the digital control unit;
   exchanging data between the digital control unit and the pixel processing after the pixel processing unit has completed processing of a current set of processing spots for one frame.

17. A non-transitory computer readable medium comprising computer instructions which, when executed by a processor, configure the processor to perform the acts of:
   determining by a digital control unit a set of processing spots in an image area from a stream of image values;
   determining by a pixel processing unit at least one characteristic parameter of the set of processing spots set by the digital control unit;
   storing the at least one characteristic parameter in a memory;

post-processing the at least one characteristic parameter by the digital control unit;

exchanging data between the digital control unit and the pixel processing unit after the pixel processing unit has completed processing of a current set of processing spots for one frame.

* * * * *